E. H. LEONARD.
LADY'S VEIL HOLDER.
APPLICATION FILED NOV. 18, 1912.
1,078,362.
Patented Nov. 11, 1913.
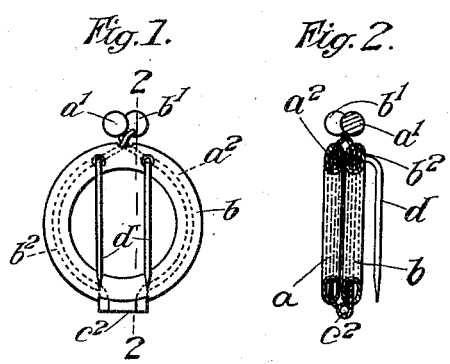
Witnesses.
Inventor.

UNITED STATES PATENT OFFICE

EMMA HILL LEONARD, OF CHELSEA, LONDON, ENGLAND, ASSIGNOR OF ONE-HALF TO BLANCHE MARY SHERA, OF CHELSEA, ENGLAND.

LADY'S VEIL-HOLDER.

1,078,362.     Specification of Letters Patent.     Patented Nov. 11, 1913.

Application filed November 18, 1912.  Serial No. 731,962.

*To all whom it may concern:*

Be it known that I, EMMA HILL LEONARD, a subject of the King of Great Britain, residing at 112 Beaufort Mansions, Beaufort street, Chelsea, in the county of London, England, have invented certain new and useful Improvements in or Relating to Ladies' Veil-Holders, of which the following is a specification.

This invention relates to ladies' veil holders which are adapted to secure veils on ladies' hats, the chief object being to improve the construction thereof and to render the same more reliable in operation.

According to this invention the veil holder comprises a pair of rings which are hinged together and adapted to be opened and closed to receive and secure the ends of a veil or the like. The said rings are provided with a peripheral snap catch or other similar device which is adapted to secure the rings in the closed position. A pin or pins may be provided on one of the said rings for attaching the holder to a hat.

In order that the said invention may be clearly understood and readily carried into effect I will proceed to describe the same more fully with reference to the accompanying drawing in which—

Figure 1 is a face view of the device. Fig. 2 is a sectional view taken on the line 2—2 of Fig. 1.

The rings $a$, $b$ are of tubular or hollow formation and are furnished with engaging means such as knobs $a'$, $b'$ mounted on the extremities of two semi-circular members $a^2$, $b^2$. These members pass through the respective rings $a$, $b$, and the ends thereof remote from the knobs are wound around the hinge pin $c^2$.

The ends of the veil may be passed through the ring $a$ and drawn outwardly between the two rings, or the ends of the veil may be laid upon the ring $b$. In either case the ends of the veil are secured by closing the hinge and by pressure effecting the engagement of the knobs $a'$, $b'$ or other securing device or catch. The ring $b$ may be formed or provided with a pin or pins $d$ whereby the device can be attached to the hat.

It will be apparent that the surfaces of the rings may be engraved, chased or otherwise ornamented as desired.

What I claim and desire to secure by Letters Patent of the United States is:—

1. In a veil holder, the combination of a pair of hollow rings, two semi-circular members passing through each of said rings, a catch arranged at one end of each of said members, and a hinge pin engaged by the other end thereof so that said rings may be capable of being opened and securely closed.

2. In a veil holder the combination of a pair of hollow rings, two semicircular members passing through each of said rings, a knob arranged at one end of each of said members and a hinge pin engaged by the other end thereof so that said rings may be capable of being opened and securely closed.

In testimony whereof I affix my signature in presence of two witnesses.

EMMA HILL LEONARD.

Witnesses:
T. SELBY WARDLE,
W. J. SKERTEN.

---

Copies of this patent may be obtained for five cents each, by addressing the "Commissioner of Patents, Washington, D. C."